INVENTOR.
WALDEMAR SAEGER
BY [signature]

ATTORNEY

INVENTOR.
WALDEMAR SAEGER
BY Anthony D. Cennamo
ATTORNEY

INVENTOR.
WALDEMAR SAEGER
BY Anthony L. Cennamo
ATTORNEY

FACSIMILE PHASE COHERENT SYNCHRONIZATION

Filed Dec. 17, 1965 4 Sheets-Sheet 4

INVENTOR.
WALDEMAR SAEGER

United States Patent Office 3,458,835
Patented July 29, 1969

3,458,835
FACSIMILE PHASE COHERENT SYNCHRONIZATION

Waldemar Saeger, La Canada, Calif., assignor to Xerox Corporation, Rochester, N.Y., a corporation of New York Filed Dec. 17, 1965, Ser. No. 514,639
Int. Cl. H03c 3/00; H04b 1/16; H04l 27/00
U.S. Cl. 332—23 5 Claims

ABSTRACT OF THE DISCLOSURE

In a timing signal generating circuit a presynchronizing pulse which precedes and ends at a predetermined reference time and a synchronizing pulse which begins at the reference time are coupled to a frequency shift oscillator to provide jitter free transmission of timing signals. The presynchronizing and synchronizing pulses are derived from frequency divider circuits and both pulses pass through a zero axis crossing at the predetermined reference time.

This application relates to frequency shift modulation systems useful in transmitting facsimile signals as well as other forms of data.

Data signals, whether representing sound, pictures, digital data or the like, must generally be modulated into a different frequency domain before they can be transmitted by electromagnetic waves or over long cables. A common method, useful for transmitting facsimile signals over telephone lines and for many other purposes, is known as frequency shift modulation. It is analogous to FM broadcasting and is accomplished by applying data signals as control signals to a frequency modulation oscillator, the output of which has a frequency which is a function of the value of the input data signal and may be applied to a transmitting antenna or a telephone line or the like for transmission. If the data signal is of the two-level or binary form, then the oscillator output frequency will generally be one of two predetermined frequencies which can be designated as the 0 and 1 frequencies or mark and space frequencies. The original data input signal can be recreated at a remote receiving location by passing the received signals through some form of frequency modulation detector which produces an output signal which is a function of the received frequency. Where two-level signals are involved it is preferred for noise reduction purposes to use a detector which provides a two-level output depending upon whether the received signal appears to be above or below some predetermined threshold frequency intermediate the 0 and 1 frequencies. Where the frequency of data transitions may approach the oscillator frequencies, as in transmission over narrow band telephone lines, broadcast type FM detectors are unsuitable because they effectively average frequency over a large number of cycles. A preferred type of detector is one which measures the time between zero measures the time between zero crossings of a received waveform and compares each such measured time interval against a predetermined reference time. Although detectors of this type are well known and form no part of the present invention, reference may be had to U.S.

Patent 3,202,834 for description of certain improved forms.

In frequency shift communications systems of the described variety, it is generally desired to transmit at least some signals which can serve as a timing reference at the receiver. In the case of facsimile transmission, these signals may be synchronizing signals which are periodically transmitted and used to keep a facsimile receiver in precise synchronism with its associated transmitter. Desirably, the time delay between the transmission and reception of at least such timing signals should be a constant value. Random variations in such time delay are recognized as jitter and can cause unsatisfactory synchronization between a facsimile transmitter and receiver with resulting degradation of image quality. Such jitter is equally undesirable in other forms of communication. It will be shown, however, that such jitter is inherent in ordinary frequency shift communication.

Accordingly, it is the principal object of the invention to provide frequency shift transmission means and methods for providing jitter free transmission of timing signals. Subsidiary objects will become apparent from the following detailed description of the invention in conjunction with reference to the drawings in which.

Figure 1A:
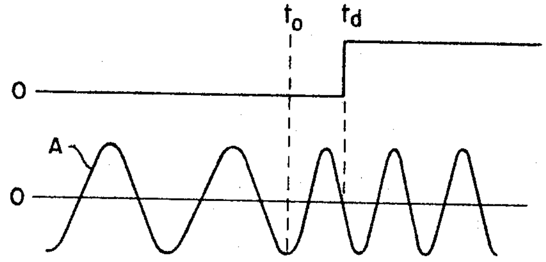
FIGS. 1A and 1B show frequency shift waveforms.
Figure 1B:
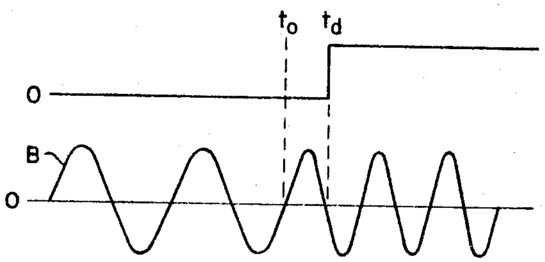

FIGS. 1A and 1B show typical waveforms A and B which might be transmitted over a telephone line as well as the corresponding demodulated waveforms. Purely for illustrative purposes and without any intent to be limited thereto, it may be assumed that 1300 cycles is the 0 frequency and 2300 cycles is the 1 frequency and that a timing signal is to be transmitted as a transition from the 0 to the 1 frequency. The advantages of the invention would be even greater if the timing signal were transmitted as a transition from a higher to a lower frequency. In FIG. 1A, a frequency shift corresponding to a change in the input data occurs at time $t_0$ which is intermediate between zero crossings. Under these conditions the altered frequency will first be detected at a time $t_d$. FIG. 1B shows a different situation in which the frequency shift occurs at a time $t_0$ which corresponds to a zero crossing. The frequency shift will be detected at time $t_d$ which will be the very next zero crossing. The pertinent time delay is $t_d - t_0$ and is clearly different in FIGS. 1A and 1B. If the time $t_0$ is fixed or recurs at fixed intervals, it will not occur at any predetermined phase of the 1300 cycle waveform. Accordingly, the received signal will have objectionable jitter with respect to the transmitted signal. It will be understood that the transmitted waveforms should always be continuous as shown, since discontinuities introduce undesirable high frequency components into the waveform power spectrum. For this reason frequency shift modulation is not generally carried out by switching back and forth between two independent oscillators.

Figure 2:
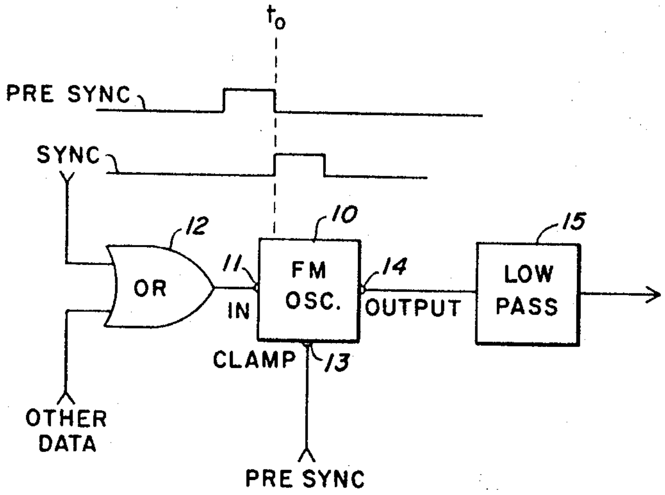
FIG. 2 shows one form of frequency shift modulator in accordance with the invention.

FIG. 2 is a diagram of one form of improved modulator according to the invention. A frequency modulation oscillator 10 produces an output signal, at terminal 14, which is controlled by the data signal at input terminal 11. An "OR" gate 12 permits either of two different signal sources to be connected to input terminal 11. Gate 12 may be either a conventional digital gate or a conventional linear adder. One of the inputs represents the normal data which is to be transmitted and the other input represents timing or sync signals which are to be transmitted with zero jitter. A presync signal is applied to a clamp terminal 13 of the oscillator and internally sets the oscillator to a predetermined phase. If the oscillator is of the RC variety, clamping may be accomplished by holding a timing capacitor at zero, ground or any other predetermined voltage level. The power supply voltage need not necessarily be disconnected. Where the oscillator is of the LC variety, the resonant circuit may be discharged or the current through the inductance may be held at some predetermined value. Oscillator 10 may be of either the square wave or sine wave variety. Since square wave oscillators are generally simpler to construct in the frequency range chosen for illustrative purposes, a low pass filter 15 is shown to convert the square wave output to an approximation of a sine wave for transmission. The filter may be omitted if the oscillator 10 is of the sine wave variety or if the rectangular waves are acceptable for transmission.

The sync and presync signals are related in time as shown. Specifically, the presync signal ends at and the sync signal starts at or before the referenced time $t_0$ which is to be transmitted.

Figure 4:
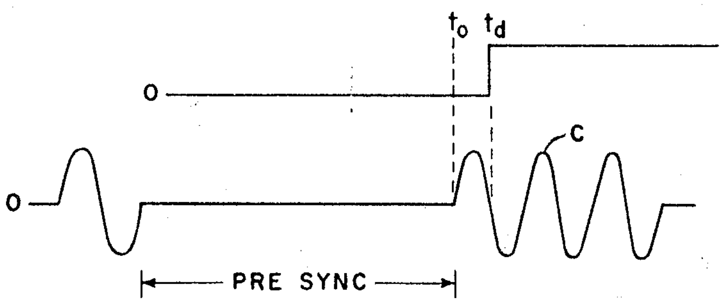
FIG. 4 shows a waveform generated by the circuit of FIG. 2.

FIG. 4 illustrates the waveform C produced by the circuits of FIG. 2. Prior to time $t_0$ there is an interval in which no output is produced. At time $t_0$, oscillator 10 starts to oscillate from a predetermined phase corresponding to the clamp condition. The phase is illustrativley and preferably zero or 180°, but any predetermined phase relationship can be chosen, provided it is reproducible. Reference phases on the order of 90° or 270° are likely to cause difficulty in detection. With the illustrative wavefrom, the time of detection, $t_d$, will reliably occur at the next zero crossing as illustrated. Accordingly, the time delay $t_d - t_0$ will be a fixed time equal to ½ cycle of the transmitted frequency which illustratively is 2300 cycles. Accordingly, the transmitted timing or sync signal can be detected without jitter.

Figure 3:
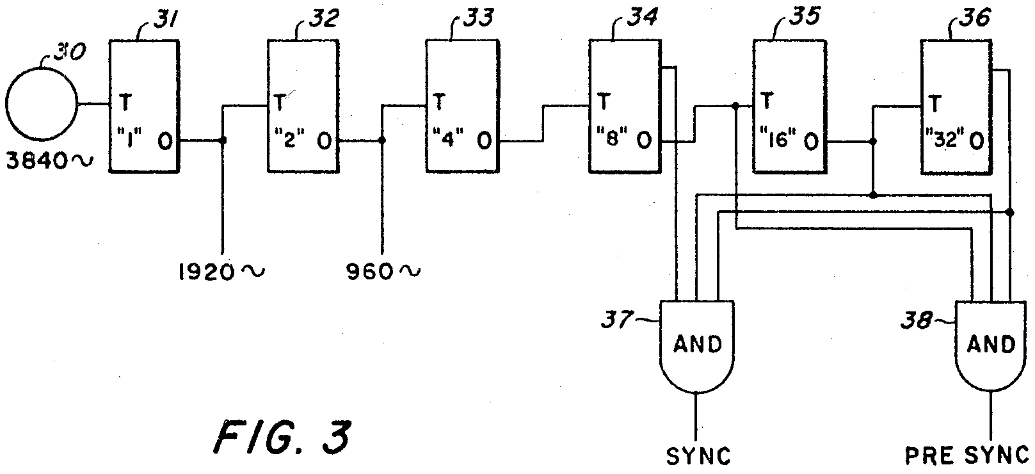
FIG. 3 shows timing circuits utilizable in connection with apparatus illustrated in other figures.

FIG. 3 is a block diagram of an illustrative timing circuit which can be utilized to provide the sync and presync signals for the modulator of FIG. 2 and can also supply other waveforms for subsequent figures. A 3840 cycle oscillator 30 drives a chain of frequency dividers 31 through 36. An AND gate 37 generates a signal at count 40 through 47 of the six-stage divider, this signal being repetitive at 60 cycles unless otherwise gated. AND gate 38 provides a similar signal at counts 32 through 39. Thus, the presync signal ends and the sync signal starts at the same time; namely, at count 40 of the divider. A 960 cycle square wave is also derived from the output of divider 32 and a 1920 cycle wave from the output of divider 31.

Difficulties may be experienced with the circuit of FIG. 2 when used with a very sensitive FM detector, or if the connection between the illustrated modulator and the remote detector is at all noisy. Under these conditions, the detector may respond strongly to transmitted noise in the no-signal interval just prior to time $t_0$, or even to noise internally generated in the detector. This condition can give rise to spurious output signals from the detector. It will be recognized that this effect is similar in principle to the strong white noise produced by an FM broadcast receiver when not tuned to an active broadcast station.

Figure 6:
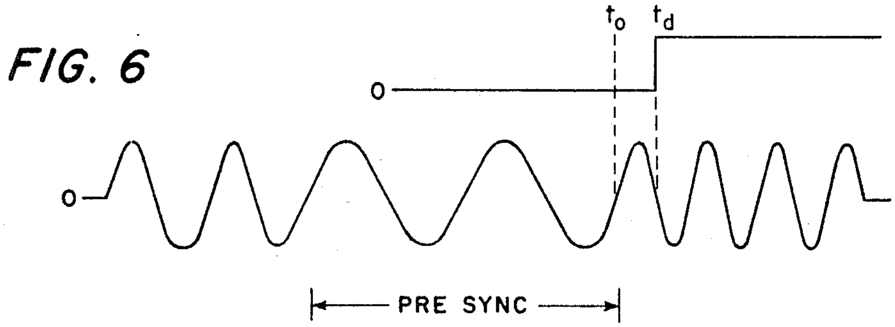
FIG. 6 shows a waveform generated by the modulator of FIG. 5.
Figure 5:
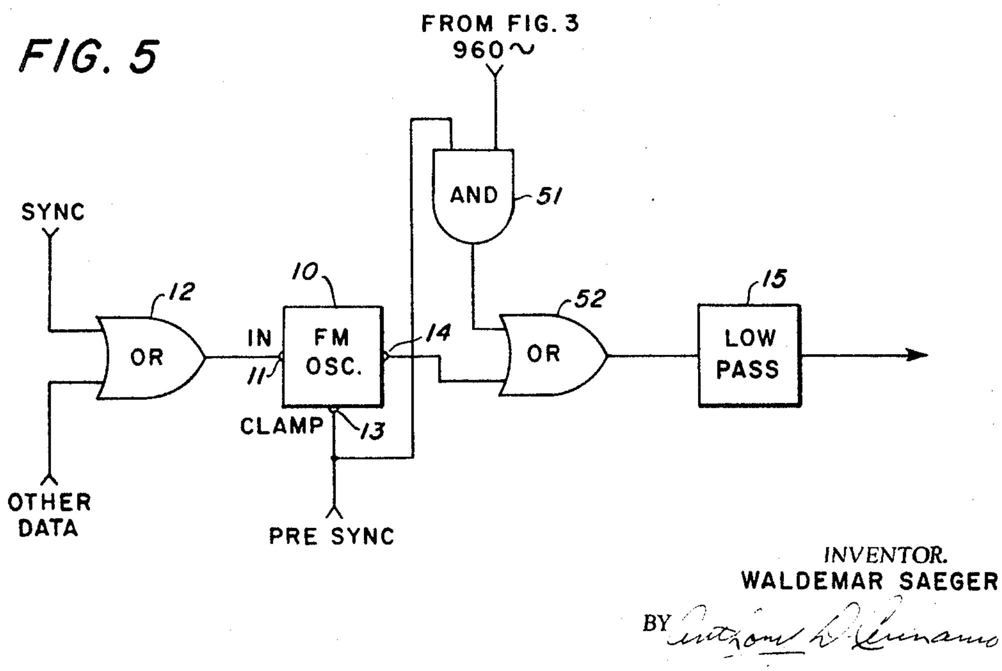
FIG. 5 shows a different form of frequency shift modulator in accordance with another aspect of the invention.

FIG. 5 is a block diagram of one form of improved frequency shift modulator in accordance with another aspect of the invention which overcomes this problem. In this circuit, the presync signal clamps oscillator 10 as before, but is also applied to an "AND" gate 51 to permit passage therethrough of an externally generated frequency. In the illustrated embodmient, this signal is a 960 cycle signal derived from divider 32 of FIG. 3. This signal is applied to one input of an "OR" gate 52, the other input of which is connected to the output 14 of oscillator 10. Thus, when the oscillator is clamped by the presync signal, the 960 cycle signal is transmitted. At the commencement of the sync signal, the 960 cycle signal is turned off and the output oscillator 10 is transmitted instead. Since the 960 cycle signal passes through zero at time $t_0$, there is no discontinuity in the transmitted waveform at $t_0$ as illustrated in FIG. 6. In this way, false triggering of the detector is avoided and at the same time, continuity of the waveform is preserved and the frequency shift at time $t_0$ occurs at fixed phase. Although the 960 cycle frequency is different from the 1300 cycles illustratively described as the 0 frequency, it will still be detected as a 0 rather than a 1 frequency.

The frequency applied through gate 51 should be detected as corresponding to the data signal level opposite to that transmitted during the sync interval. This will generally permit the use of a broad range of frequencies. It is, however, necessary in all cases that the phase of the selected waveform be fixed with respect to time $t_0$ so as to maintain substantial continuity of the transmitted waveform. The frequency applied to gate 51 can, of course, be substantially identical to the illustrative 1300 cycle frequency or its functional equivalent.

Figure 7:
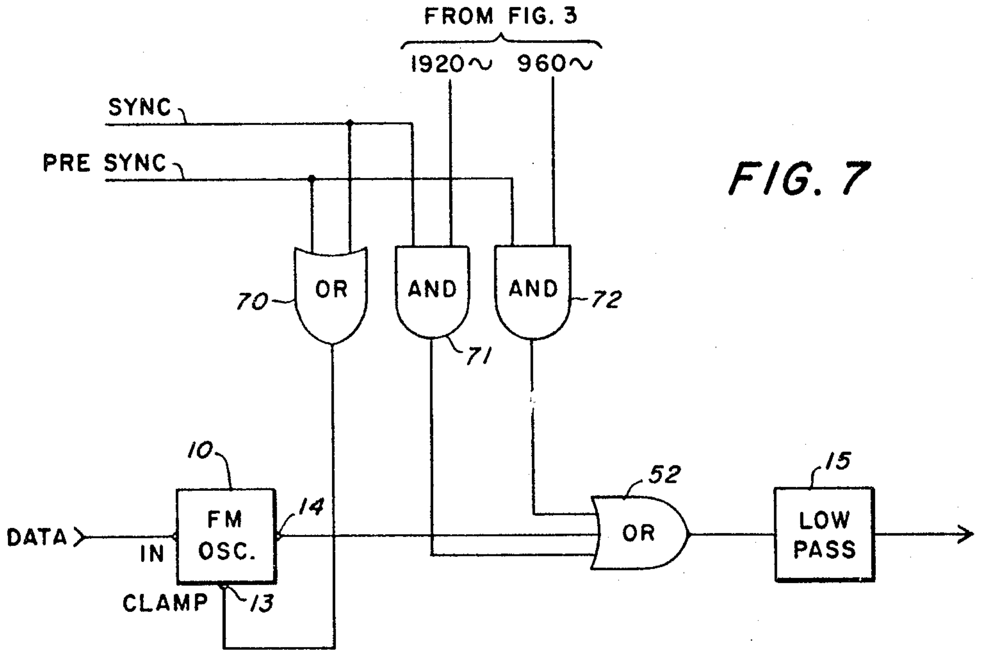
FIG. 7 shows still a further embodiment of a modulator in accordance with another aspect of the invention.

FIG. 7 shows an alternative embodiment of the invention in which oscillator 10 is shut off during both the sync and the presync intervals. The sync and presync signals are combined in an "OR" gate 70 which can be used to clamp oscillator 10. However, simpler means than previously described can be used to clamp the oscillator including turning off the supply power or gating off the output. A 960 cycle signal from FIG. 3 is gated through AND gate 72 by the presync signal and applied to "OR" gate 52. Similarly, a 1920 cycle signal from FIG. 3 is gated through "AND" gate 71 by the sync signal and is also applied to "OR" gate 52. In this circuit, there should be no overlap between the presync and sync signals. Since each of the 960 and 1920 cycle signals pass through zero in the same direction at time $t_0$, jitter free detection of the transmitted transition is easily possible. Of course, the described system should be used with a detector designed to optimally distinguish 1920 and 960 cycles rather than 2300 and 1300 cycles. However, known extensions of the techniques illustrated in FIG. 3 can provide two frequencies of almost any value and ratio, provided that the ratio is the quotient of two integers. In the circuit of FIG. 7, normal data transmission is effected by oscillator 10 in response to binary or other suitable input data signals and sync and presync signals are generated by gates 71 nad 72 respectivley, while the output from oscillator 10 is suppressed by signals, i.e., sync and presync, coupled to clamp 13.

Figure 8:
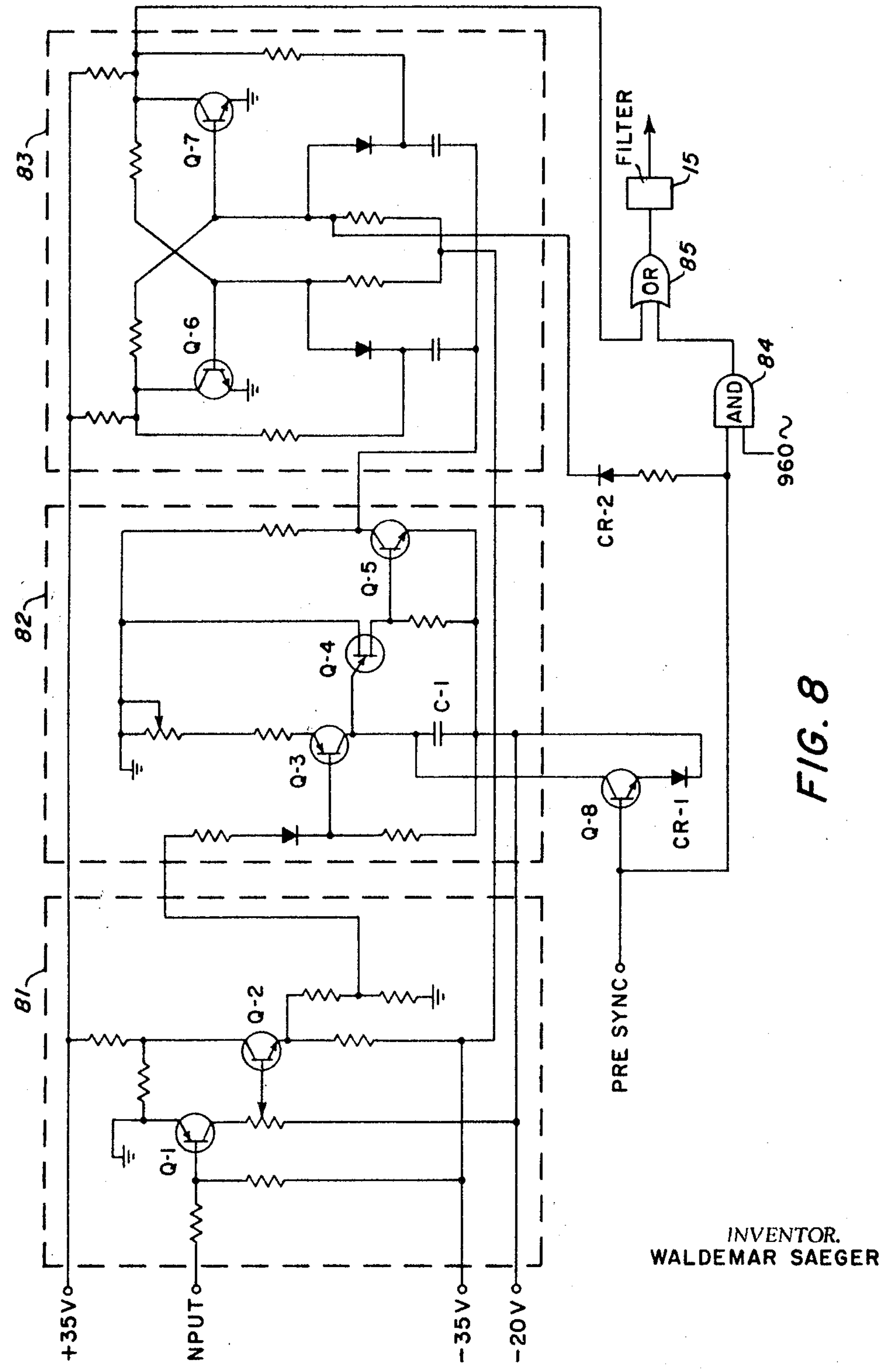
FIG. 8 is a schematic diagram of an illustrative modulator.

FIG. 8 shows an illustrative embodiment of the invention in greater circuit detail. The input sync or other signal is first amplified in a preamplifier 81 and then applied to a variable frequency pulse generator 82 in which Q3 functions as a constant current generator, the output of which is controlled by the signal applied from preamplifier 81. A low pass filter may be interposed between preamplifier 81 and pulse generator 82 to smooth the signal transitions. Transistor Q3 linearly charges a capacitor C1 which is also connected to the emitter of a unijunction transistor Q4. Whenever the voltage across capacitor C1 reaches a predetermined value, it is discharged through unijunction transistor Q4 and the resulting pulse is amplified by transistor Q5. Capacitor C1 then starts to charge again and the process is repeated. The output of pulse generator 82 is a series of pulses having a spacing determined by the input voltage applied to the preamplifier 81. These pulses are applied to a conventional trigger flip-flop 83, which changes state each time a pulse is received, and therefore, produces at transistor Q7 a rectangular waveform which is frequency modulated by the input to preamplifier 81.

A transistor Q8 is connected across capacitor C1 and shorts the capacitance whenever a positive presync pulse is applied to the base of Q8. A diode CR1 is placed in series with transistor Q8 and prevents capacitor C1 from being discharged below a few tenths of a volt. This is the same voltage to which capacitor C1 is discharged by transistor Q4. Accordingly, transistor Q8 clamps capacitor C1 to a voltage of the same value from which it starts to charge in normal oscillator operation. The same presync pulse is applied through diode CR2 to the base of transistor Q7 and holds the corresponding collector at zero volts during the presync pulse. Since the collector Q7 is connected to one input of "OR" gate 85, only transitions applied to the other input of gate 85 will appear at the gate output. The presync signal is also used to gate 960 cycles from the circuit of FIG. 3 through AND gate 84 to the other input of "OR" gate 85. Accordingly, the output of "OR" gate 85 is identical to the previously described output of "OR" gate 52 of FIG. 5 and may be passed through a low pass filter 15 and further amplified if desired.

While the invention is useful for transmitting various types of data over transmission systems operating in various frequency ranges, it is particularly useful for transmitting facsimile signals over ordinary telephone lines. For a better understanding of this function, reference may be had to the facsimile transceiver disclosed and claimed in application entitled, Facsimile III: Basic Layout, and having Ser. No. 492,203, filed Oct. 1, 1965, which is incorporated herein by reference. If the present modulator is used in that apparatus, the signal described as the video end signal may be used as the presync signal of this application and the master sync signal of said application may be used as the sync signal in this application. With this modification no "OR" gate is required at the input to the modulator, since the sync and video signals are already combined.

The specific circuits and particular frequencies used in this specification were selected for illustrative purposes only and without any intent to limit the invention thereto. It is, therefore, applicant's intention to be limited only as indicated by the scope of the following claims.

What is claimed is:

1. A timing signal circuit for generating timing signals having an initially fixed phase relationship with respect to a predetermined reference time comprising:

a transmission line terminal adapted to transmit said timing signals, oscillator means for generating frequency modulated signals for transmission in response to input data, means for generating a first frequency and a second frequency timing signal, said first and second frequency timing signals having a predetermined phase relationship with respect to said reference time, means for generating a presynchronizing pulse and a synchronizing pulse, said presynchronizing and synchronizing pulses being of predetermined duration and of fixed phase relationship with respect to said reference time, first gating means coupled to said oscillator means foi suppressing the output of said oscillator means during said presynchronizing and synchronizing pulse intervals, second gating means responsive to said presynchronizing pulse for selectively coupling said first frequency timing signal to said transmission line terminal, means for coupling said presynchronizing and synchronizing pulses to said first and second gating means, third gating means responsive to said synchronizing pulse for selectively coupling said second frequency timing signal to said transmission line terminal during the duration of said synchronizing pulse, and means for coupling said first and second frequencies to said second and third gating means.

2. A timing signal generating circuit for periodically developing timing waveforms having a predetermined phase relationship at a reference time comprising:

variable frequency pulse generating means including capacitive timing means for generating repetitive pulses in response to the application of a first input signal, bistable means coupled to said variable pulse generating means for generating a train of binary pulses, means coupled to said pulse generating means responsive to a second input signal for clamping said capacitor to a predetermined level and for holding said bistable means in a predetermined state during the duration of said second input pulse, AND gate means coupled to said bistable means responsive to said second input signal and to a fixed frequency timing signal for gating said fixed frequency timing signal during the duration of said second signal, output OR gate means responsive to the output of said bistable means and to the output of said AND gate, means for logically combining said outputs, and low pass filter means for converting signals emanating from said OR gate means into substantially sinusoidal waveforms.

3. A frequency shift modulator capable of transmitting signals including timing signals which can be detected at a reproducible time after transmission comprising:

(a) a FM oscillator for generating FM signals upon the receipt of input pulses, (b) means for generating a presync pulse for a period prior to a reference time and a sync pulse which starts at the end of said presync pulse and at said reference time, (c) means coupling said sync pulse to said oscillator at said reference time at which time said sync pulse is to be transmitted, (d) means for coupling said presync pulse to a clamping terminal of said oscillator for preventing said oscillator from operating before said reference time, said presync pulse internally clamps said oscillator to a a fixed level, and effective at said reference time unclamps said oscillator to allow it to start oscillating from said level at a predetermined frequency and a fixed phase with respect to said reference time.

4. A signal generating circuit for providing a signal to a transmission line comprising:

(a) an FM oscillator for generating an FM output signal upon the receipt of an input pulse, (b) means for generating a presync pulse for a period just prior to a reference time and a sync pulse just after said presync pulse and at said reference time, (c) means coupling said sync pulse to the input terminal of said oscillator at said reference time at which time said sync pulse is to be transmitted, (d) means coupling said presync pulse to a clamping terminal of said oscillator for preventing its operation before said reference time, said presync pulse internally clamps said oscillator to a fixed level and effective at said reference time unclamps said oscillator to allow it to start oscillating from said level at a predetermined frequency and a fixed phase with respect to said reference time, (e) a switching means, (f) means for additionally coupling said presync pulse to said switching means to couple a fixed frequency source to said transmission line only during the application of said presync pulse.

5. A signal generating circuit in accordance with claim 4 wherein said fixed phase is 0+ radians wherein *n* is an integer including 0.

References Cited

UNITED STATES PATENTS

| | | | | |
|---|---|---|---|---|
| 3,190,958 | 6/1965 | Bullwinkel et al. | 178—66 | |
| 3,202,834 | 8/1965 | Pingry et al. | 307—233 | |
| 3,205,441 | 9/1965 | Likel | 178—66 | X |
| 3,223,925 | 12/1965 | Florac et al. | 332—22 | X |
| 3,244,985 | 4/1966 | Turecki | 307—269 | X |

ROY LAKE, Primary Examiner

LAWRENCE J. DAHL, Assistant Examiner

U.S. Cl. X.R.

178—66; 325—320; 331—172